UNITED STATES PATENT OFFICE.

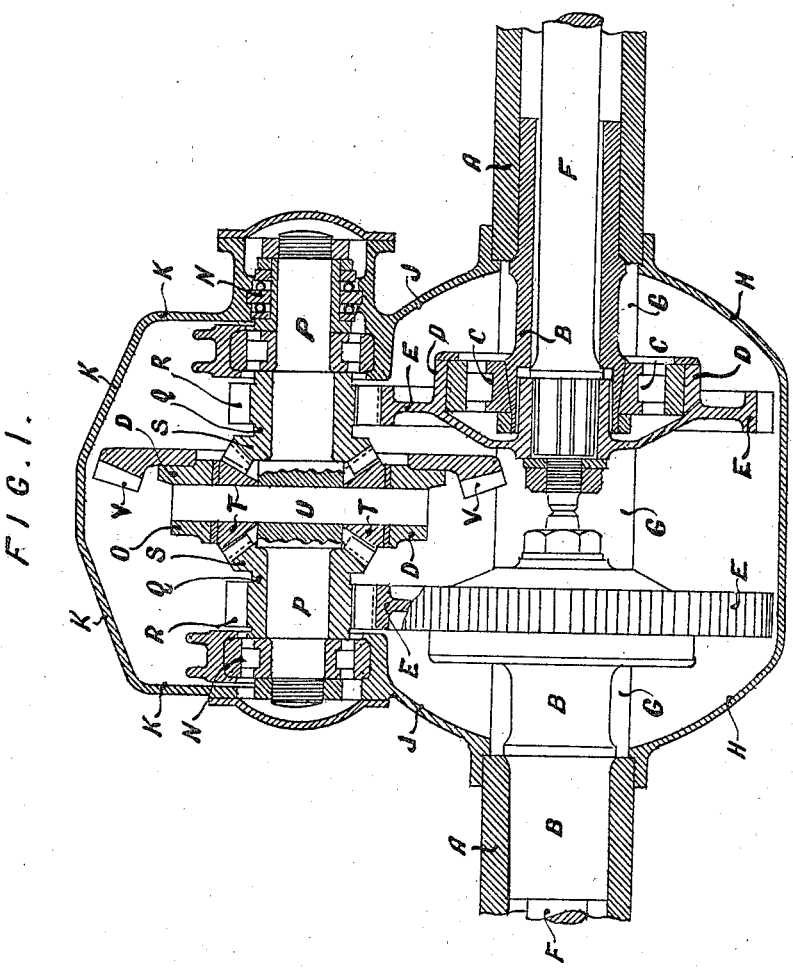

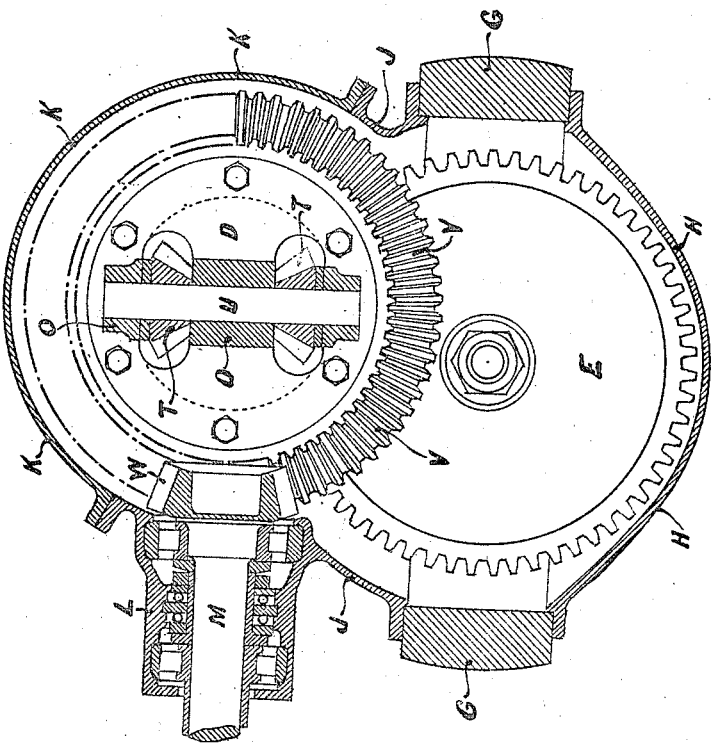

THOMAS BLACKWOOD MURRAY, OF SCOTSTOUN, SCOTLAND.

CONSTRUCTION OF TRANSMISSION MECHANISM.

1,238,044.

Specification of Letters Patent. Patented Aug. 21, 1917.

Application filed March 8, 1917. Serial No. 153,506.

*To all whom it may concern:*

Be it known that I, THOMAS BLACKWOOD MURRAY, B. Sc., M. Inst. C. E., a subject of the King of Great Britain and Ireland, and a resident of Scotstoun, in the county of Renfrew, Scotland, have invented certain new and useful Improvements in Construction of Transmission Mechanism, and of which the following is the specification.

The invention relates to "live" back axles principally intended for use in heavy commercial vehicles, and of the type in which there is a final train of reduction gearing, and has for its object to provide a robust and simple structure readily accessible.

In carrying out the invention the body of the axle is of well known ring type, the axle proper consisting of a single forging having two tubes extending laterally from a central annular portion. According to the first part of the invention there is forced into each of the inner and enlarged openings of the tubes within the annulus a sleeve. Or these sleeves may be made in a piece with the tubes. Rigidly mounted on these sleeves are the inner races of two ball or roller bearings, the outer races of which carry the pinions of the final drive. These pinions are belled to receive the bearings and the inner ends of the sleeves, and have bosses projecting within the sleeves for their attachment to the driving shafts lying within the tubes.

The axle is arranged with the plane of its annulus horizontal, and a semi-spheroidal inclosing case provided with the usual lubrication arrangements is bolted beneath it. To the upper face of the annulus is bolted an annular case. Closing the upper end of this is a second spheroidal case provided with housings for the rear end of the propeller shaft and with axial bearings for the intermediate and differential shaft which lies parallel with, and above the axle proper.

The differential gear carried on this shaft with the pinions gearing with the final pinions on the internal axle shafts consists of a single piece central member having laterally extending stub axles or trunnions forming the differential shaft. The planetary pinions are received in apertures formed through the member and are secured therein by a pivot pin. The bevel wheel engaged by the bevel pinion of the propeller shaft is bolted directly to the central member. The central pinions of the differential gear are on sleeves on the stub differential shaft, and on these sleeves are also the pinions transmitting to the axle shafts. End thrust of the differential bevel pinions is taken between the sleeves and collars on the stub shaft and is thus entirely self-contained—moreover a certain amount of frictional restraint at this point is well-known to be of advantage. The stub differential shaft with the sleeves thereon is supported upon ball or roller bearings in the upper spheroidal casing—end thrust bearings being also provided to take the thrust of the propeller shaft pinion.

An example of an axle embodying the features set forth is shown in sectional rear elevation in Figure 1 and in sectional side elevation in Fig. 2 on two accompanying sheets of explanatory drawings.

In this example there are forced into the inner ends of the usual tubes A of the axle, sleeves B. Mounted on the inner ends of these sleeves B are the inner races of ball bearings C the outer races of which engage flanges D on the belled pinions E of the final drive, which pinions are of course fixed upon the inner ends of the usual driving shafts F. The axle tubes A are extensions of the ring forging G forming the central portion of the axle. A semi-spheroidal case H provided with usual lubricating arrangements is secured beneath this forging, and above it is secured a more or less annular case J provided with a housing L for the rear end of the propeller shaft M. Bolted to the annular case J is a second spheroidal case K with axial bearings N for the intermediate and differential shaft which lies parallel with and above the axle proper.

The differential gear, consists of a single-piece central member O having laterally extending stub-axles P which form the differential shaft. On the axles P are loosely mounted sleeves Q on which are formed pinions R of the final reduction train and which gear with the final drive pinions E. On the sleeves Q are also formed the central pinions S of the differential gear, the planetary pinions T of which are mounted in apertures in the member O and carried on a long pin U passing therethrough.

The bevel wheel V by which the drive is transmitted from the bevel pinion W on the end of the propeller shaft M is bolted directly to the member O. The propeller shaft is provided with journal and thrust bearings as are also the stub shafts P.

What I claim is:—

1. Transmission mechanism comprising a tubular axle and a central annular forging integral therewith, sleeves, projecting from the tubular portions of the axle into the area of said central annular portion, bearing devices on said sleeves, shafts extending through said tubular portions and sleeves, toothed wheels on the inner ends of said shafts, said wheels being belled to engage said bearings, a differential shaft and pinions thereon gearing with said toothed wheels, in combination with casings supported by and inclosing the annular portion of the axle and supporting and inclosing said differential shaft.

2. Transmission mechanism comprising a tubular axle and a central annular forging integral therewith, sleeves projecting from the tubular portions of the axle into the area of said central annular portion, bearing devices on said sleeves, shafts extending through said tubular portions and sleeves, toothed wheels on the inner ends of said shafts, said wheels being belled to engage said bearings, a differential gear device comprising a one piece member having projecting stub axles, planetary pinions set in said single piece member, sleeves loose on said stub axles and central differential pinions and drive transmitting pinions fast on the sleeves, together with a casing supported by and inclosing the annular portion of the axle and supporting and inclosing said differential shaft, the stub axles of the one piece member of the differential having their bearings in said casing, substantially as described.

In testimony whereof I have signed my name to this specification, in the presence of two subscribing witnesses.

THOMAS BLACKWOOD MURRAY.

Witnesses:
DAVID FERGUSON,
JAMES EAGLESOM.